United States Patent
Keefer et al.

(10) Patent No.: US 10,686,792 B1
(45) Date of Patent: Jun. 16, 2020

(54) APPARATUS AND METHOD FOR ADMINISTERING USER IDENTITIES ACROSS ON PREMISE AND THIRD-PARTY COMPUTATION RESOURCES

(71) Applicant: Nuvolex, Inc., Palo Alto, CA (US)

(72) Inventors: Joshua Keefer, Union City, CA (US); Brian Hamel, San Jose, CA (US)

(73) Assignee: Nuvolex, Inc., Palo Alto, CA (US)

( * ) Notice: Subject to any disclaimer, the term of this patent is extended or adjusted under 35 U.S.C. 154(b) by 332 days.

(21) Appl. No.: 15/594,406

(22) Filed: May 12, 2017

Related U.S. Application Data

(60) Provisional application No. 62/336,401, filed on May 13, 2016.

(51) Int. Cl.
| | | |
|---|---|---|
| *H04L 29/08* | (2006.01) | |
| *H04L 29/06* | (2006.01) | |
| *H04L 12/26* | (2006.01) | |

(52) U.S. Cl.
CPC ............ *H04L 63/102* (2013.01); *H04L 43/04* (2013.01); *H04L 63/105* (2013.01); *H04L 67/10* (2013.01); *H04L 67/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,250,186 | B2 * | 8/2012 | Wang | H04L 41/0816 370/352 |
| 8,955,112 | B2 * | 2/2015 | Nguyen | H04L 45/306 726/22 |
| 9,276,825 | B2 * | 3/2016 | Misovski | H04L 41/5051 |
| 9,313,189 | B2 * | 4/2016 | Tankov | H04L 63/08 |
| 9,661,011 | B1 * | 5/2017 | Van Horenbeeck | H04L 63/1425 |
| 10,033,662 | B2 * | 7/2018 | Gupte | H04L 67/10 |
| 10,038,714 | B2 * | 7/2018 | Waters, Jr. | H04L 63/1458 |
| 10,257,069 | B1 * | 4/2019 | Ingram | G06F 16/188 |
| 10,469,330 | B1 * | 11/2019 | Roth | H04L 41/22 |
| 2003/0154399 | A1 * | 8/2003 | Zuk | H04L 63/0254 726/11 |
| 2004/0088571 | A1 * | 5/2004 | Jerrim | G06F 21/552 726/1 |
| 2004/0250124 | A1 * | 12/2004 | Chesla | G06F 21/552 726/13 |

(Continued)

*Primary Examiner* — Piotr Poltorak
(74) *Attorney, Agent, or Firm* — Cooley LLP

(57) ABSTRACT

A machine has a network interface circuit to coordinate communications with a network. A processor is connected to the network interface circuit. A memory is connected to the processor and the network interface circuit. The memory stores instructions executed by the processor to collect network traffic from the network through the network interface circuit. The network traffic includes on premise identity service user object data and cloud service user object data. Merged user objects are derived from the network traffic. Each merged user object includes user object attributes from the on premise identity service user object data and user object attributes from the cloud service user object data. The merged user objects are utilized to administer access over the network to on premise computation resources and third-party computation resources.

1 Claim, 2 Drawing Sheets

(56) References Cited

U.S. PATENT DOCUMENTS

| | | | |
|---|---|---|---|
| 2005/0022022 A1* | 1/2005 | Mendonca | G06F 21/55 726/4 |
| 2005/0076245 A1* | 4/2005 | Graham | G06F 21/552 726/4 |
| 2006/0026669 A1* | 2/2006 | Zakas | H04L 29/06 726/6 |
| 2006/0048142 A1* | 3/2006 | Roese | H04L 41/0893 717/176 |
| 2006/0075093 A1* | 4/2006 | Frattura | H04L 41/0681 709/224 |
| 2006/0161816 A1* | 7/2006 | Gula | H04L 41/065 714/39 |
| 2006/0174342 A1* | 8/2006 | Zaheer | G06F 21/56 726/23 |
| 2006/0282895 A1* | 12/2006 | Rentzis | G06F 21/56 726/24 |
| 2008/0235755 A1* | 9/2008 | Blaisdell | H04L 63/0227 726/1 |
| 2009/0070880 A1* | 3/2009 | Harris | G06F 21/552 726/25 |
| 2010/0169497 A1* | 7/2010 | Klimentiev | G06F 9/546 709/228 |
| 2010/0306847 A1* | 12/2010 | Lambert | G06F 21/552 726/24 |
| 2010/0333165 A1* | 12/2010 | Basak | H04L 63/0218 726/1 |
| 2011/0016214 A1* | 1/2011 | Jackson | G06F 9/5044 709/226 |
| 2011/0047204 A1* | 2/2011 | Mansoor | G06F 17/30893 709/202 |
| 2012/0130973 A1* | 5/2012 | Tamm | G06Q 10/00 707/706 |
| 2012/0204261 A1* | 8/2012 | Mantripragada | H04L 12/66 726/22 |
| 2012/0233118 A1* | 9/2012 | Holt | H04L 67/06 707/620 |
| 2012/0233311 A1* | 9/2012 | Parker | H04L 43/00 709/224 |
| 2013/0036213 A1* | 2/2013 | Hasan | H04L 67/1097 709/223 |
| 2013/0061306 A1* | 3/2013 | Sinn | H04L 67/10 726/7 |
| 2013/0191542 A1* | 7/2013 | Matczynski | G06F 9/5022 709/226 |
| 2013/0312097 A1* | 11/2013 | Turnbull | G06F 21/55 726/24 |
| 2013/0339423 A1* | 12/2013 | Degtiarov | G06F 9/5072 709/203 |
| 2014/0013434 A1* | 1/2014 | Ranum | H04L 63/145 726/24 |
| 2014/0096251 A1* | 4/2014 | Doctor | H04L 63/1408 726/23 |
| 2014/0245423 A1* | 8/2014 | Lee | H04L 63/0218 726/12 |
| 2014/0282525 A1* | 9/2014 | Sapuram | G06Q 30/0631 718/1 |
| 2015/0033340 A1* | 1/2015 | Giokas | H04L 63/1433 726/23 |
| 2015/0052144 A1* | 2/2015 | Mari | G06F 16/285 707/740 |
| 2015/0134827 A1* | 5/2015 | Shah | H04L 67/16 709/226 |
| 2015/0244597 A1* | 8/2015 | Maes | G06Q 10/10 715/736 |
| 2015/0271193 A1* | 9/2015 | Estes | H04L 63/1416 726/23 |
| 2015/0341240 A1* | 11/2015 | Iyoob | H04L 43/08 709/201 |
| 2016/0019278 A1* | 1/2016 | Jadhav | H04L 67/1095 707/624 |
| 2016/0088000 A1* | 3/2016 | Siva Kumar | H04L 63/083 726/23 |
| 2016/0094517 A1* | 3/2016 | Kang | H04L 63/0236 726/1 |
| 2016/0149763 A1* | 5/2016 | Ingram | H04L 41/0806 709/224 |
| 2016/0323301 A1* | 11/2016 | Boss | H04L 63/1416 |
| 2017/0013002 A1* | 1/2017 | Stevenson | H04L 63/1433 |
| 2017/0104813 A1* | 4/2017 | Liu | H04L 67/10 |
| 2017/0134506 A1* | 5/2017 | Rotem | H04L 67/16 |
| 2018/0026997 A1* | 1/2018 | Johnston | H04L 63/1458 726/23 |
| 2018/0035142 A1* | 2/2018 | Rao | H04N 21/252 |
| 2018/0069885 A1* | 3/2018 | Patterson | G06F 17/30283 |
| 2018/0091393 A1* | 3/2018 | He | H04L 43/065 |

* cited by examiner

APPARATUS AND METHOD FOR ADMINISTERING USER IDENTITIES ACROSS ON PREMISE AND THIRD-PARTY COMPUTATION RESOURCES

CROSS-REFERENCE TO RELATED APPLICATION

This application claims priority to U.S. Provisional Patent Application Ser. No. 62/336,401, filed May 13, 2016, the contents of which are incorporated herein by reference.

FIELD OF THE INVENTION

This invention relates generally to communications in computer networks. More particularly, this invention is directed toward administering user identities across on premise and third-party computation resources.

BACKGROUND OF THE INVENTION

Cloud computing refers to the use of a third-party computation resource (e.g., Amazon Web Services®, Microsoft Azure®, etc.) to meet information technology requirements for an enterprise. Cloud computing has produced a fundamental shift in the way technology resources are administered, distributed and consumed. These fundamental changes have caused a significant disruption of the existing business processes for information technology resources. The disruption is mainly attributed to cloud resources being sourced from systems that reside outside of the control of the enterprise. Historically, all systems have been operated and controlled "in-house" on the enterprise's premises. Today, businesses still maintain a majority of systems on premises, but are beginning to augment these on premise systems with public cloud services. This creates a "hybrid" environment made up of on premise systems and services as well as public cloud services.

Accordingly, there is a need for organizations to maintain an efficient and streamlined administration across these disparate systems

SUMMARY OF THE INVENTION

A machine has a network interface circuit to coordinate communications with a network. A processor is connected to the network interface circuit. A memory is connected to the processor and the network interface circuit. The memory stores instructions executed by the processor to collect network traffic from the network through the network interface circuit. The network traffic includes on premise identity service user object data and cloud service user object data. Merged user objects are derived from the network traffic. Each merged user object includes user object attributes from the on premise identity service user object data and user object attributes from the cloud service user object data. The merged user objects are utilized to administer access over the network to on premise computation resources and third-party computation resources.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
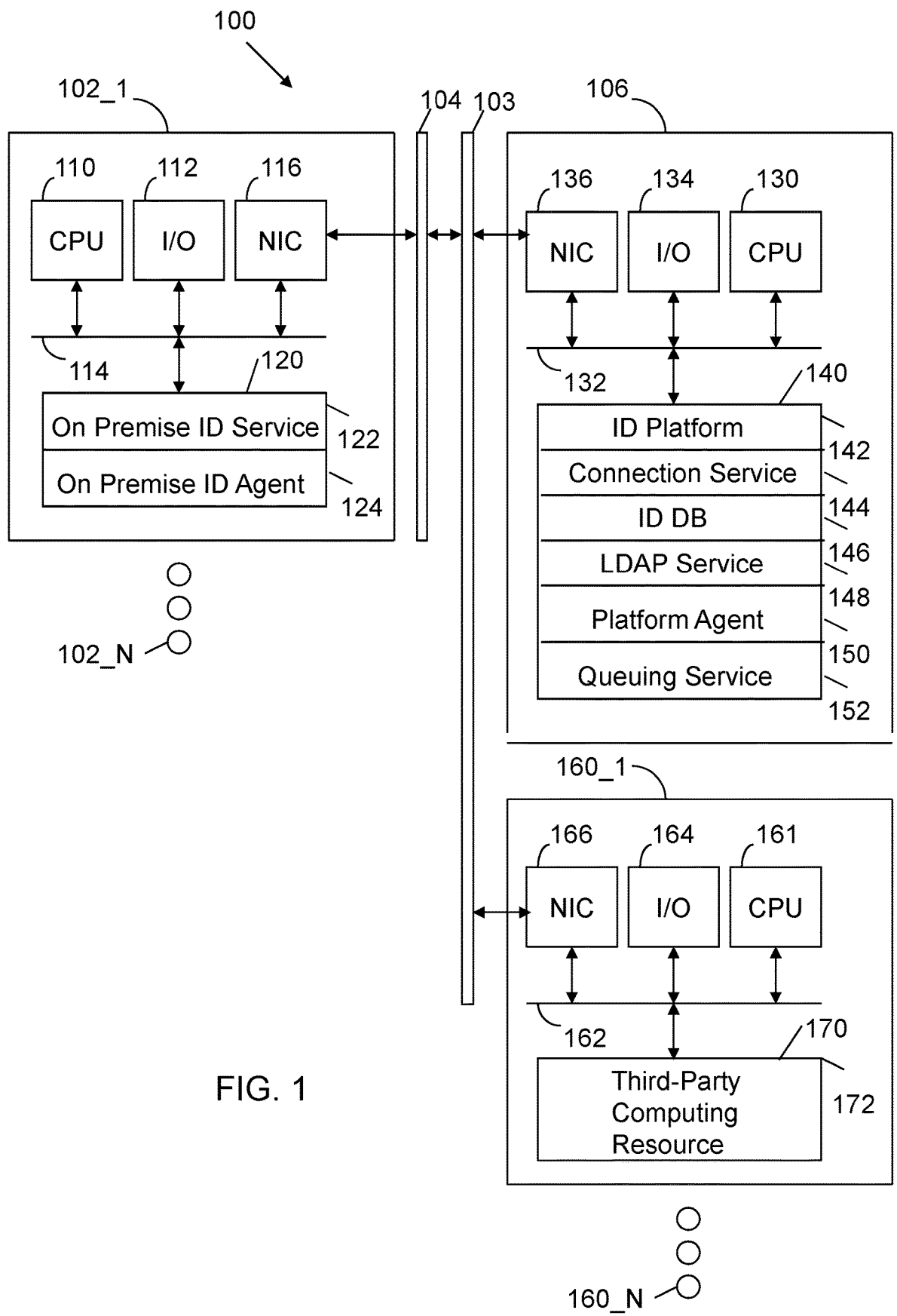
FIG. 1 illustrates a system configured in accordance with an embodiment of the invention.

FIG. 1 illustrates a system 100 configured in accordance with an embodiment of the invention. The system 100 includes a set of enterprise computers 102_1 through 102_N connected to a network 103 through a firewall 104. The network 103 may be any combination of wired and wireless networks. Each enterprise computer includes standard components, such as a central processing unit 110 connected to input/output devices 112 via a bus 114. The input/output devices 112 may include a keyboard, mouse, touch display and the like. A network interface circuit 116 is also connected to the bus 114 to provide access to network 103. A memory 120 is also connected to the bus 114. The memory 120 stores instructions executed by the central processing unit 110 to implement operations disclosed herein. In one embodiment, the memory 120 stores an on premise identification service 122 to coordinate on premise identification verification and credentialing, as discussed in detail below. The memory 120 also stores an on premise identification agent 124 to coordinate agent communications across the system 100, as discussed in detail below.

The system 100 also includes an identification administration server 106 connected to network 103. The identification administration server 106 coordinates operations between enterprise computers 102_1 through 102_N and third-party computing servers 160_1 through 160_N. The identification administration server 106 is shown as a single machine, but the operations performed by the machine may be distributed across multiple machines. The server 106 includes standard components, such as a central processing unit 130, bus 132, input/output devices 134 and a network interface circuit 136 to provide connectivity to network 103. A memory 140 is connected to the bus 132. The memory stores instructions executed by the central processing unit 130 to implement operations disclosed herein. In one embodiment, the memory stores an identification platform module 142, a connection service module 144, an identification database 146, an LDAD service module 148, a platform agent 150 and a queuing service module 152. The operations performed by these modules are detailed below.

Each third-party computer server includes standard components, such as a central processing unit 161, a bus 162, input/output devices 164 and a network interface circuit 166 to provide connectivity to network 103. A memory 170 is connected to the bus 162. The memory stores a third-party computing resource module 172 to administer access and utilization of a third-party computer server.

In order for on premise user identities to consume cloud service resources, the on premise user object must also be created and managed in each cloud service, then granted authorization to access the desired cloud service resource. There is currently no unified method that will concurrently apply administrative actions to both on premise identity service user objects and cloud service resources. Administrative actions must be performed independently in the on premise identity service and then separately performed in the cloud service. On premise user identity systems have no native awareness of cloud service resources. This creates an administrative barrier between on premise user objects and cloud service resources, which user objects in the organization need to access. In an on premise only environment (no cloud services), most user identity administration and authorization tasks are natively converged and centralized. On premise resources have awareness, communication and are seamlessly integrated with each other. With the introduction of cloud services (public or private), user administration and authorization is decentralized, forcing IT administrators to manually perform administrative tasks for each individual cloud service, independent of the on premise identity service. This is contrary to the methods and processes performed in the past, where IT resources and assets are housed and interconnected on premise. Adoption of cloud technologies bring efficiencies to the way an organization's IT infrastructure is deployed, maintained and made available. However, in many cases when incorporating cloud resources into an organization, administration and authorization of user identities or user objects across on premise and cloud environments have become disjointed, inconsistent, and highly inefficient.

The disclosed technology bridges the administrative gap between an on premise user identity service and cloud service resources by combining the administration and authorization of cloud service resources and on premise user identities into a unified administration console. When unifying on premise and cloud service administration/authorization, the ability to automate tasks that span between on premise and cloud services is enabled. This helps organizations overcome the challenges created by the consumption of cloud service resources and allows these organizations to regain operational efficiency and dramatically lower ongoing support costs.

The disclosed technology may be deployed as a cloud based Software-as-a-Service (Saas) application or on computation resources on premise. The technology integrates with an organization's on premise identity service in order to obtain user and group attributes and data. The technology also connects to various cloud services, where cloud resource attributes and data are obtained using the web APIs of the cloud service. These data sources are connected into the disclosed system where IT administrators of the platform are able to act on and manipulate user objects and attributes sourced from either an on premise identity service or from a cloud service.

IT administrators are granted the right to access the platform. Beyond platform access rights are organizational specific Role Based Access Controls ("RBAC"). RBAC defines the scope of the IT administrator's rights to perform certain actions or access certain user identities and data, either from the on premise identity service or from the cloud services. Using the disclosed technology IT administrators can automate their tasks by creating policies that combine cloud service and on premise administrative functions.

To integrate with the organization's on premise identity service 122, the IT administrator installs and configures the on premise identification agent 124 that will create a communication route between the organization's on premise identity service 122 and the identification administration server 106. Once the agent 124 is installed and configured, and communication between the identification administration server 106 and the organization's on premise identity service 122 has been established, the IT administrator imports the organizations on premise identity service data. After the on premise identity service data has been imported, the IT administrator can perform administration and authorization tasks against the on premise identity service user and group objects. The IT administrator also integrates the identification administration server 106 with each of the cloud services 160_1 through 160_N consumed by the organization. This is accomplished by the IT administrator granting access to the identification administration server 106 to read and write to each cloud service's resources and directories. Once access has been granted, the identification administration server 106 platform performs an import of the resource data from each of the specified cloud services 160_1 through 160_N. At this point, the identification administration server 106 is fully integrated with the organization's on premise identity service and the cloud service resources utilized by the organization.

The IT administrator then begins to perform administration and authorization tasks on all user and group objects being sourced from both environments. Any administrative changes made on the identification administration server 106 are automatically directed to their proper endpoint—either the cloud service 160 or the on premise identity service 122. The platform is designed to have on premise identity service user and group object changes to be sent to the on premise identity service 122. Any changes made on the identification administration server 106 to cloud service resources are sent to the destination of the cloud service resource. This creates an integrated and virtually seamless management experience across both environments.

When the identification administration server 106 is integrated with an on premise identity service 122 and one or more cloud services 160, there will be multiple user objects that exist that represent the same user. This is because each cloud service keeps a copy of a user's identity to be used for specific purposes with each cloud service. For example, user A has one user object in the on premise identity service, one user object associated with cloud service 1, and one user object associated with cloud service 2. The result is that user A now has three user objects associated with its unique identity.

The identification administration server 106 transforms each user object from the on premise identity service as well as all cloud services into a single manageable object, the details of which are discussed below.

For each cloud service that is integrated into the identification administration server 106, a complete list of users and their attributes that are associated with each cloud service is imported into the identification administration server 106. Each user object has a unique identifier that is consistent across the on premise identity service and every cloud service a user is connected to. After integration of the on premise identity service and cloud services into the identification administration server 106, the server 106 looks for the consistent unique user identifier to discover all attributes sourced from the on premise identity service and the various cloud services that relate to a unique user. Then the platform merges all associated user attributes into a single user object. Table I lists attributes of a user object utilized in accordance with an embodiment of the invention.

TABLE I

| User Attribute | Source | Purpose |
| --- | --- | --- |
| ID | ID Database 146 | The user ID is the singular identifier used by the platform 142 which all data for a unique user is stored under. Referencing the unique user's single ID allows the platform 142 to retrieve any data from any cloud service 172 or on premise identity service 122. |

TABLE I-continued

| User Attribute | Source | Purpose |
| --- | --- | --- |
| firstName | On premise identity service and Cloud Services | This if the first name of a unique user and is an attribute that is merged across all services that are imported. |
| lastName | On premise identity service and Cloud Services | This is the surname of a unique user and is an attribute that is merged across all services that are imported. |
| username | On premise identity service and Cloud Services | The username for a unique user is typically an email address; however each cloud service can dictate its own username for each unique user in which this attribute would be listed multiple times for each unique username for each cloud service. |
| displayName | On premise identity service and Cloud Services | Display Name is represented as a First/Last name when viewing a user in the on premise identity service or in cloud services. |
| mobilePhone | On premise identity service and Cloud Services | Included in the unique user's personal information is the mobile phone which is found in the unique user's record in the on premise identity service and all cloud services used by the unique user. |
| officePhone | On premise identity service and Cloud Services | Included in the unique user's personal information is the office phone which is found in the unique user's record in the on premise identity service and all cloud services used by the unique user. |
| job Title | On premise identity service and Cloud Services | The job title is a common attribute across on premise identity services and cloud services used for user search and filtering operations. |
| department | On premise identity service and Cloud Services | The Department is a common attribute across on premise identity services and cloud services used for user search and filtering operations. |
| guid | On premise identity service | The Globally Unique Identifier (guid) is an attribute that is unique to the on premise identity service active directory. The guid is used by the platform to identify users within an Active Directory service. |
| fromActiveDirectory | Nuvolex Database | Used to identify users that are synchronized to the platform from an Active Directory instance. |
| streetAddress | On premise identity service and Cloud Services | Included in the unique user's personal information is the street address of the unique user which is included in the unique users address data that is found in the unique user's data in the on premise identity service and all cloud services used by the unique user. |
| city | On premise identity service and Cloud Services | Included in the unique user's personal information is the city of the unique user which is included in the unique users address data that is found in the unique user's data in the on premise identity service and all cloud services used by the unique user. |
| country | On premise identity service and Cloud Services | Included in the unique user's personal information is the country of the unique user which is included in the unique users address data that is found in the unique user's data in the on premise identity service and all cloud services used by the unique user. |
| state | On premise identity service and Cloud Services | Included in the unique user's personal information is the state of the unique user which is included in the unique users address data that is found in the unique user's data in the on premise identity service and all cloud services used by the unique user. |
| zipCode | On premise identity service and Cloud Services | Included in the unique user's personal information is the zip code/postal code of the unique user which is included in the unique users address data that is found in the unique user's data in the on premise identity service and all cloud services used by the unique user. |
| directorySynchronizationEnabled | Cloud Service | When a user is synchronized from an on premise identity service directly to an external cloud service, the user is considered as Directory Sync Enabled. With that comes a specific set of limitations that the platform follows. |
| lastDirSyncTime | Cloud Service | If a user is considered as Directory Sync Enabled, this attribute will provide information on the last sync update that the user was a part of. |
| dirSync | On premise identity service | When a user is synchronized from an on premise identity service directly to an external cloud service, the user is considered as Directory Sync Enabled. With that comes a specific set of limitations that the platform follows. This attribute provides Directory Sync data from the on premise identity service rather than from the cloud service, and when combined gives a fully detailed view of the users sync data. |
| distributionGroups | On premise identity service and Cloud Services | If the user is a member of a group type called Distribution Groups in an on premise identity service and/or in cloud services, the groups that the user is a member of will be held in this attribute. |
| securityGroups | On premise identity service and Cloud Services | If the user is a member of a group type called Security Groups in an on premise identity service and/or in cloud services, the groups that the user is a member of will be held in this attribute. |
| primarySmtpAddress | On premise identity service and Cloud Services | In email systems either on premise or from a cloud service, a unique user has a primary email address which in some cases is mirrored from an on premise identity service to a cloud email service Primary email addresses from on premise identity services and cloud services will be |

TABLE I-continued

| User Attribute | Source | Purpose |
|---|---|---|
| | | merged into a single attribute for a unique user on the platform. |
| emailAliases | On premise identity service and Cloud Services | A unique user can have one or many email aliases that are alternative email addresses which in some cases are mirrored from an on premise identity service to a cloud email service. Alias email addresses from on premise identity services and cloud services are merged into a single attribute for a unique user on the platform. |
| assignedLicenses: sku_id | Cloud Service | Assigned licenses attribute gives information and control abilities to manage cloud service license assignment for a unique user. |
| proxyAddresses | On premise identity service and Cloud Services | A unique user can have one or many proxy addresses that are alternative email addresses which in some cases are mirrored from an on premise identity service to a cloud email service. Proxy addresses from on premise identity services and cloud services are merged into a single attribute for a unique user on the platform. |
| userForwarded | Cloud Service | This attribute relates to a user's mailbox either in an on premise or cloud email service, which gives information and control over mailbox forwarding for a unique user. |
| contactForwarded | Cloud Service | This attribute relates to a user's mailbox either in an on premise or cloud email service, which gives information and control over mailbox forwarding for a unique user. |
| mailboxPermissions | Cloud Service | This attribute relates to a user's mailbox either in an on premise or cloud email service, which gives information and control over mailbox access rights for a unique user. |
| recipientPermissions | Cloud Service | This attribute relates to a user's mailbox either in an on premise or cloud email service, which gives information and control over mailbox access rights for a unique user. |
| sendOnBehalfPermissions | Cloud Service | This attribute relates to a user's mailbox either in an on premise or cloud email service, which gives information and control over mailbox access rights for a unique user. |
| calendarPermissions | Cloud Service | This attribute relates to a user's mailbox either in an on premise or cloud email service, which gives information and control over calendar access rights for a unique user. |

Attention is now directed toward an embodiment of the identification administration server 106. The memory 140 may store an identification platform 142. The platform 142 may include an Apache® web server to handle http/https requests made to the platform. Apache® Tomcat® may be used to interface with other modules. The platform 142 is accessed as a web application from a standard web browser. In one embodiment, the Apache web server and Apache Tomcat server are employed to deliver pages produced by platform 142 to the IT administrator's web browser. The IT administrator authenticates into the platform 142 to access the data that the IT administrator is authorized to view and manipulate. For example, the IT administrator may be using one of the on premise machines, such as 102_1.

An IT administrator enters a username and password for authentication. In one embodiment, an Apache Directory Services/Open Lightweight Directory Access Protocol (LDAP) service validates that the IT administrator has entered the correct information. Upon validation of the IT administrator's identity, a successful authentication is achieved. At this point the platform 142 matches the IT administrator's identity from the Apache Directory Services/OpenLDAP system and retrieves the data that the IT administrator has been authorized to access from the ID database 146.

The IT administrator is able to access the data that was previously imported from the organization's on premise identity service 122 and cloud services 172. In one embodiment, the data is digested by MongoDB® and is then stored in ID database 146 (e.g., a mySQL database). Data is periodically refreshed when an IT administrator launches a forced synchronization action. The forced synchronization updates the data that was previously imported into the platform 142. The data residing in the on premise identity service and supported cloud services is kept in sync with the ID platform 142 data. Data inconsistencies create a number of administrative issues that impede the IT administrator's ability to seamlessly manage all users across this hybrid environment. To overcome this challenge, the platform 142 has utilized several automatic sync processes and differential syncs that periodically run to keep data up to date and consistent without the involvement of the end user.

The platform 142 is capable of interfacing with several cloud services by way of publicly available Application Program Interfaces ("APIs") that are offered by each supported cloud service vendor 172. These APIs are all consumed in different ways, and each has their own unique integration method. Many of the APIs used by the platform 142 are REST or GRAPH based APIs that allow the platform to read and write to the resources that are sourced from the cloud service.

As an example, when the platform 142 is integrated with a cloud service (e.g., 172), cloud service user objects and resources (such as, licenses, storage quotas, additional resource entitlements, and the like) are imported into the platform 142. Once the cloud service data is imported, IT administrators using the platform 142 are able to view and manipulate the imported data. For example, a user "Josh Keefer" is present in and consumes resources from a cloud service that has been integrated with the platform 142. An IT Administrator for Josh Keefer's organization using the platform 142 is able to modify Josh Keefer's cloud service licenses, resource access entitlements, along with various other entities and attributes that relate to the cloud service.

The connection service 144 is responsible for sending data between the platform 142 and external cloud services 172. When the platform 142 receives a request to perform an action on a cloud service resource and the associated cloud service objects, the request is generated by the platform 142 and is then passed to the connection service 144 to execute the request against the corresponding cloud service. When the request has been completed, a "completed request" message is sent from the connection service 144 to the platform 142, which acknowledges that the request has been completed.

The ID DB 146 is the central repository where platform data is stored. The ID DB stores data that is used by each element of the application. Anytime data is imported into the platform 142 from any source, whether data from a cloud service or the on premise identity service, the imported data is stored in the ID DB 146 and can be later accessed by the IT administrator. When an IT administrator makes a change on a specific tenant's cloud service data, the change is processed and recorded in the ID DB 146, and then is further transacted on by other components. The ID DB 146 also stores access privileges for each of the IT administrators that have been given access to the ID platform 142.

Every IT administrator that uses the ID platform 142 has a user object that contains information on the IT administrator as well as a credential (username and password). This user and credential data is stored within the LDAP service 148. When an IT administrator attempts to gain access to the ID platform 142, the IT administrator submits a credential that matches with the IT administrator credential data that is sourced from the LDAP service 148. If the match is successful, the LDAP service 146 authenticates the IT administrator, and allows access to the ID platform 142.

The LDAP service 146 may also include an agent LDAP Server component for agent identification and authentication purposes. A platform agent 150 is provided with a unique set of credentials which are generated and stored within the Agent LDAP Server component. Anytime a specific agent (e.g., on premise ID agent 124) connects to the platform 142, the agent must present its credentials to establish communication. The Agent LDAP Server component validates the agent credentials and then authenticates the agent. After the agent has been authenticated, communication is established between the ID platform 142 and the agent.

A queuing service 152 enables the ID platform 142 to communicate with agents that reside on various on premise environments that are outside of the local TCP/IP network. The queuing service 152 is deployed on one or many clustered computers to ensure reliability and is then connected to the ID platform 142. The queuing service 152 is connected to the Internet using HTTPS to send and receive data from agents. Anytime that the ID platform 142 receives a request to perform an action on the on premise identity services object 122, the request is generated on the ID platform 142 and is then sent to the queuing service 152 to be passed to and processed by the on premise agent 124. When the request has been completed by the agent 124, request completion data is sent from the agent 124 back to the queuing service 152 and then to the ID platform 142, which acknowledges that the request has been completed.

The on premise ID agent 124 sends and receives data from the queuing service 152, which interacts with the ID platform 142. When an IT administrator makes a request pertaining to on premise identity service object data, the request is sent from the ID platform 142 to the queuing service 152, then to the on premise ID agent 124, which digests the request and performs the required function. When the agent 124 has completed the request, the agent 124 sends request completion data back to the queuing service 152, which is sent to the ID platform 142 to be displayed to the IT administrator to confirm that the request was completed.

The on premise ID service 122 holds user identity and group data which is read and written to using the on premise ID Agent 124. When an IT administrator sends a request to perform an action on an on premise identity service 122 user or group object, the requested action is sent from the ID platform component 142 to the queuing service 152 and is then sent to the agent 124, which processes and performs the change or data read request in the on premise ID service 122.

The on premise ID agent 124 is a software application that sends and receives messages over the Internet to the ID platform 142. In one embodiment, the agent 124 is delivered as an executable package that is deployed on a Microsoft® Windows® based computer that is connected to an internal local network and communicates with the organization's on premise identity service 122.

The on premise identity service 122 maintains a directory of information technology users within an organization. Each on premise identity service user has a number of unique attributes, such as the user's address, user details and password. When an organization using the platform 142 deploys an on premise agent 124, the on premise users and their attributes are collected and imported into the platform 142. After the on premise identity service user data is imported and merged with any cloud service user data already existing on the platform 142, an IT administrator from the organization can modify the on premise identity service user data, and that modified data will then be written directly into the on premise identity service 122 via the on premise ID agent 124. For example, the same user "Josh Keefer" as previously mentioned is a on premise identity service user as well as a user of cloud services in an organization. Using the platform 142, Josh Keefer's IT administrator can modify Josh Keefer's on premise identity user attributes like username, password, and address details along with many other user attributes. When changes to an on premise identity service user are made, the changes are carried out by the on premise agent 124 in order to update the user name, password and address details directly in the on premise identity service 122.

The installation process for the on premise ID agent 124 requires the IT administrator to specify information that is unique to their organization so that the agent 124 can create a successful connection with the organizations on premise identity service 122. For example, the IT administrator may be required to specify: on premise identity service administrator account details, on premise identity service local TCP/IP port, on premise identity service computer IP address, or credentials for an on premise ID agent 124 (to be used for agent authentication into the ID platform 142).

During the configuration process for the agent 124, the IT Administrator will be prompted to specify which account is to be used in order run the agent service 122 and perform on premise identity service administrative actions. The account that is specified must have the proper rights to perform administrative actions on the on premise identity service 122.

The agent 124 needs to be configured with the IP address and port for the organizations on premise identity service 122 that they wish to have on premise identity service data read from and written to. This may be a standard local IPv4 address. The port number specified is the local LDAP port that is being used by on premise identity service 122 for local LDAP functions.

The agent 124 is given a set of credentials that are established by the LDAP service 148. The agent credential serves the purpose of uniquely identifying one agent 124 from another, and is also used as a security measure to eliminate unauthorized/unauthenticated connections to the ID platform 142. The agent 124 authenticates into the ID platform 142 before a communication route is established.

In one embodiment, the agent 124 uses HTTPS to send and receive data from/to the ID platform 142. HTTPS is a commonly opened port on most, if not all firewalls 104. The goal is to deploy the agent 124 with as little change needed to be performed by the end user.

Once communication is established to the on premise identity service 122, the ID platform 142 is able to query the on premise identity service 122 and digest the on premise identity service entities/objects such as: on premise identity service user identities/objects and attributes, on premise identity service groups, and on premise identity service organizational units.

On premise identity service entities/objects are imported into the ID platform 142 and the IT administrator can then begin to perform any administration or authorization tasks against the imported on premise identity service entities/objects.

In one embodiment, the on premise ID agent 124 is a C Sharp (C#) software client that utilizes a message queueing service technology to send and receive messages to and from the ID platform 142. The agent 124 interfaces with the on premise identity service 122 using standard .NET libraries that have been utilized to perform on premise identity service functions.

Communications to and from the ID platform 142 are done by using a LDAP enabled message queueing service that queues and handles messages containing data based on a request made by the end user. Before communication is established, the agent 124 authenticates to the LDAP service 148.

The ID platform 142 creates agent resources before they are used. The ID platform 142 adds a queue to the queueing service 152 to handle messages being sent from the organizations on premise identity service 122. A credential is created in Apache directory services for the agent. Each organization on premise identity service has its own unique set of agent credentials. In one embodiment, the agent credentials are created by taking the organization's name that is registered on the ID platform 142, adding a username and a password. The IT administrator is only required to create a password for the agent 124.

When the IT administrator requests a change to be made or data to be read from the organizations on premise identity service 122, the action is requested directly on the ID Platform 142. In one embodiment, the request for the action is assembled and handled using a Java/JSON request and is then passed to the queueing service 152 to send to the on premise ID service 122 within the organization. Once the agent 124 receives the message, .NET scripts will execute the requested action. Upon completion, the agent sends back a verification message to inform the end user IT administrator that the requested change was applied successfully or encountered an error.

Figure 2:
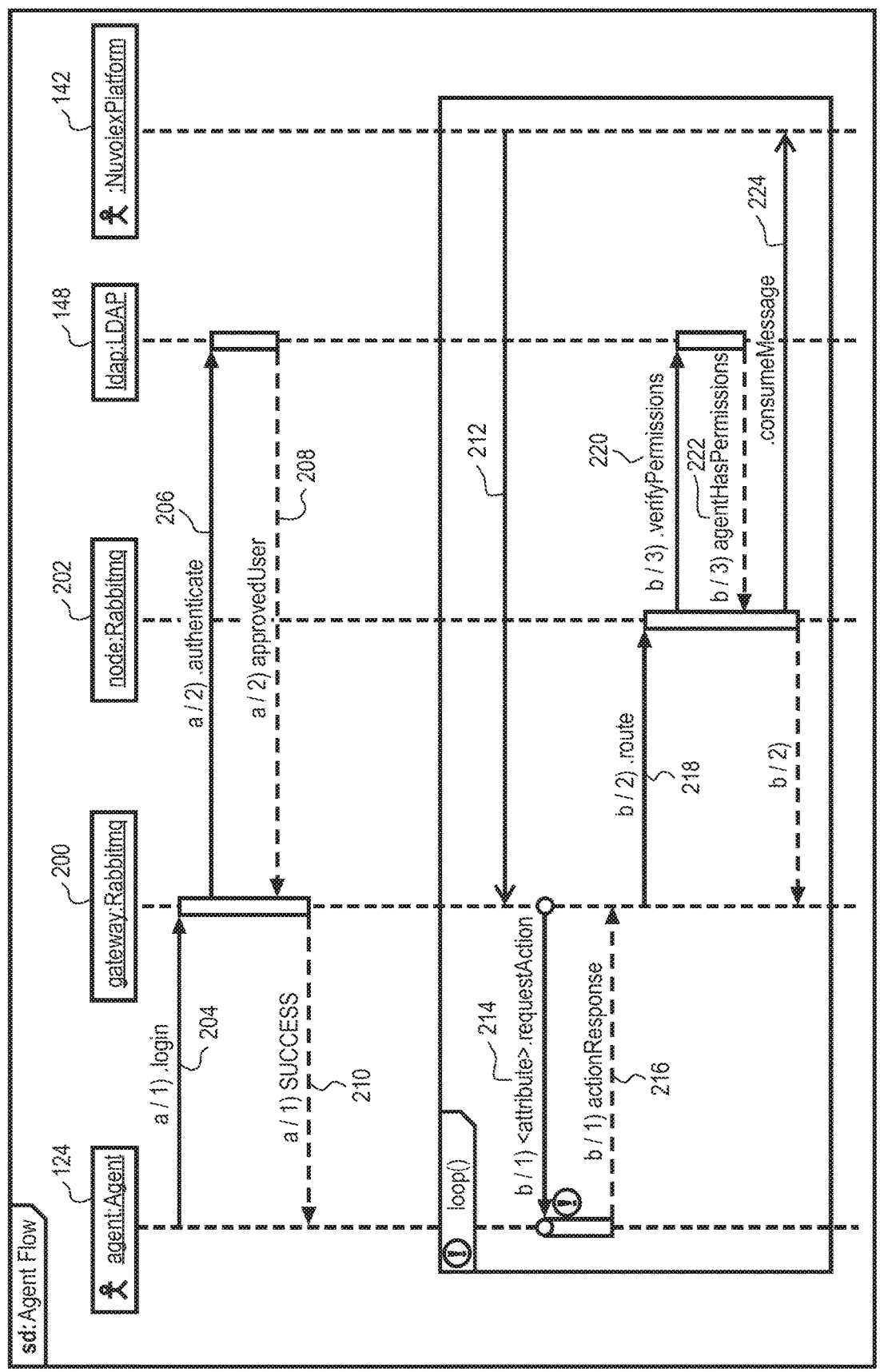
FIG. 2 illustrates signals exchanged between components of the system of FIG. 1.

FIG. 2 shows the steps taken by the agent to establish a secure connection with the ID platform 142 and process requests made by IT administrators using the platform. The figure illustrates communications between the on premise identification agent 124 and the queuing service 152, which in this instance is implemented with a gateway node 200 and an additional node 202. Multiple nodes are used in this embodiment for fault tolerance. Nodes 200 and 202 execute a Rabbit® message queue from Pivotal Software®, San Francisco, Calif. The agent 124 is installed on a computer inside an organization on premise environment and communicates with the ID platform 142 using HTTPS over the Internet 103.

On premise identity service 122 is often secured and closed off from the public internet which creates a unique challenge for data access and secure handling. When the on premise identity service 122 data is imported into the ID platform 142, unique user data from cloud services 172 and the on premise identity service 122 is merged into a single user object which can read and be manipulated by an end user of the ID platform 142. The merge process requires the ID platform 142 to look for consistent identifiers between all data sets such as the user principal name, user object GUID, or email address. Table 1 above provides an example of identifiers used in accordance with embodiments of the invention.

During the initial import of unique user data from an organization to the ID platform 142, from either a cloud service 172 or an on premise identity service 122, a new unique user object is created with data and attributes from either the cloud service 172 or the on premise identity service 122. When the organization imports data from other cloud services 172 or from an on premise identity service 122, the attributes that are specific to a cloud service or an on premise identity service are added into the existing unique user object that was provisioned in the past. The more cloud services or on premise identity integrations that are made for unique users on the platform result in a larger unique user object attribute data set, which contains attributes and data from all integrated cloud services 172 and on premise identity services 122.

The agent 124 is a software application that is installed on a computer that resides inside an organization's on premise IT environment. The agent 124 sends and receives data from the queueing service 152, which interacts with the ID platform 142. When an IT administrator makes a request pertaining to the on premise identity service 122 object data, the request is sent from the ID platform 142 to the queueing service 152, then onto the agent 124, which digests the request and performs the required function. When the agent 124 has completed the request, the agent 124 sends request completion data back to the queueing service 152, which is sent to the ID platform 142 to be displayed to the IT administrator to show that the request they made was completed.

The queuing service 152 is the public internet connection point for communication between the agent 124 and the ID platform 142. The queueing service 152 handles requests being sent to and from the agent 124. When data is sent to the queueing service 152, it is digested and then is handed off to the ID platform 142 for further processing and usage. Requests for the agent 124 generated by the ID platform 142 are sent to the queuing service 152, which processes the request and relays the request to the proper agent.

The LDAP service 148 is used for agent identification and authentication purposes. Each agent is provided with a unique set of credentials which is generated and stored within the LDAP service 148. Anytime a specific agent connects to the ID platform 142, the agent must present its credentials to establish communication. The LDAP service 148 validates the agent credentials and then authenticates the agent. After the agent has been authenticated, communication is established between the ID platform 142 and the agent 124.

The ID platform 142 is the main connection point where directives are sent to the agent 124. The agent 124 sends on premise identity data to the ID platform 142 for it to be consumed and processed. The data that is imported by the agent 124 to the ID platform 142 can be manipulated which is then sent back to the agent 124 using a similar data flow. The agent 124 receives a set of directives from the ID platform 142, then the agent 124 carries out the requested action and sends an acknowledgement back to the ID platform 142 once completed.

In order for a connection to be established, the agent 124 initially authenticates. To do this, the agent presents a credential 204 to the queueing service 152 (in this case node 200), which is then passed 206 to the LDAP service 148. The LDAP service 148 validates the credentials and authenticates 208 the agent 124. After the agent 124 has successfully authenticated 210, a connection between the ID platform 142 and the on premise ID agent 124 is established. More particularly, ID platform 142 sends a message 212 to node 200. At this point, the queueing service 152 implemented at node 200 identifies the destination agent 124 and validates the agent's permissions. The queuing service then relays the message as a request 214 to agent 124 through a secured tunnel. The agent 124 receives the request and carries out the functions required to complete the request. Upon completion of the request, the agent 124 sends a response 216 back to the queueing service 152. In particular, the response is relayed 218 from node 200 to node 202. Node 202 requests 220 a verification of permissions from the LDAP service 148. Permissions are granted 222. A message 224 is then sent to the ID platform 142.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RANI devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising instructions executed by a processor to:
   collect network traffic from a network, the network traffic including on premise identity service user object data and cloud service user object data, wherein an on premise identification agent collects from an on premise identification service module the on premise identity service user object data, wherein a message queuing service module coordinates the collection of the on premise identity service user object data from on premise identification agents distributed across the network, and wherein an application program interface is used to access the cloud service user object data,
   derive from the network traffic merged user objects, wherein each merged user object includes user object attributes from the on premise identity service user object data and user object attributes from the cloud service user object data,
   utilize the merged user objects to administer access over the network to on premise computation resources and third-party computation resources, and
   form updated merged user objects and push attributes of the updated merged user objects to nodes on the network.

* * * * *